United States Patent
Louzos et al.

[15] 3,655,453
[45] Apr. 11, 1972

[54] CATHODE MATERIAL FOR SOLID STATE BATTERIES

[72] Inventors: Demetrios V. Louzos, Rocky River; Geoffrey W. Mellors, Strongsville, both of Ohio

[73] Assignee: Union Carbide Corporation, New York, N.Y.

[22] Filed: July 16, 1970

[21] Appl. No.: 55,624

[52] U.S. Cl. ................................136/121, 23/359, 136/137
[51] Int. Cl. ...............H01m 13/02, H01m 15/06, C01c 3/08
[58] Field of Search ..................136/120 R, 121, 122, 137; 23/79, 89, 97, 359 O

[56] References Cited

UNITED STATES PATENTS 3,438,813   4/1969   Davis .................................136/121 X Primary Examiner—Winston A. Douglas
Assistant Examiner—M. J. Andrews
Attorney—Paul A. Rose, John F. Hohmann and John R. Doherty

[57] ABSTRACT

The reaction product of elemental iodine and cyanides of zinc, cadmium or alkali metal produced by heating equimolar proportions of iodine and the cyanide at a temperature of about 220° C. in a sealed vessel in the absence of water is a good cathode material for solid electrolyte cells.

6 Claims, No Drawings

CATHODE MATERIAL FOR SOLID STATE BATTERIES

This invention relates to solid state batteries and refers more particularly to materials suitable for use as cathodes in such batteries.

The theoretical advantages of batteries composed only of dry solid materials offer such promise that considerable effort has been expended in recent years to provide materials which would make possible the practical attainment of such advantages. For example, electrolytes having ionic conductivity superior to that of silver iodide used in the cell of U.S. Pat. No. 2,894,053 have recently been developed such as binary silver iodide-silver sulfide compositions, described by Reuter and Hardel in Naturwissenschaften 48, 161; the binary silver iodide-potassium iodide materials described in U.S. Pat. No. 3,443,997 and British Pat. No. 1,140,938; the binary silver iodide-alkali metal cyanide compositions described in U.S. Pat. application Ser. No. 8,709 filed Feb. 4, 1970 now U.S. Pat. No. 3,582,291 and the ternary silver iodide transition metal iodide and cyanide compositions in U. S. Pat. Application Ser. No. 55,623, filed concurrently herewith, both of which applications are in the name of G. W. Mellors and both of which are assigned to the assignee of this application. In Louzos, U. S. application Ser. No. 34,442 filed May 4, 1970 and also assigned to the assignee of this application, cells utilizing such electrolytes are described in which the cathode is an iodine complex such as iodine polyhalides and charge transfer complexes containing iodine.

The present invention comprises a material suitable for use as the cathode in solid electrolyte cells using any of the electrolytes disclosed in the patents and applications referred to, which material is the reaction product of elemental iodine and a metal cyanide, for instance of zinc or cadmium or alkali metals or mixtures of cyanides of zinc, cadmium and alkali metals. Specific examples of the materials of the invention are the reaction products of iodine and zinc cyanide [$(Zn(CN)_2$], iodine and potassium zinc cyanide [$KZn(CN)_3$] and iodine and potassium cyanide (KCN) and iodine and cadmium cyanide [$Cd(CN)_2$]. These products may be obtained by heating substantially equal molar proportions of the element and the respective cyanide at about 220° C. in a sealed vessel in the absence of water for several hours until reaction is complete. This procedure results in the production of a solid having a characteristic brown to black color and to a degree the characteristic appearance of a sintered mass. It has a distinctly lower vapor pressure of iodine at room temperature than elemental iodine.

Evidence that the reaction products so produced are true compounds is shown by infrared spectra. For instance, the reaction product of iodine and zinc cyanide so produced has an infrared spectrum with five distinct peaks at wave numbers 1620, 1340, 1145, 1095 and 800 cm.$^{-1}$. No evidence of CNI or $ZnI_2$, both of which compounds are known to form when iodine and metal cyanide are reacted in aqueous solution exist in the spectrum. When the reaction product of $I_2$ and $KZn(CN)_3$ produced as described is heated the characteristic color of iodine is absent even when the material is heated to 160° F. in a sealed glass tube. Of the specific examples given, this material appears to be the most stable at elevated temperatures. All of the materials are quite stable at room temperature and substantially no loss of iodine occurs on storage at room temperature.

A number of cells using the material of the invention as cathode have been prepared in the manner described in the Louzos application referred to above. Thus, a cathode pellet was made of equal quantities of the iodine-cyanide product and the selected electrolyte with powdered graphite and acetylene black. The anode was made in a similar way, for example by preparing a pellet of powdered silver (0.8 to 1.2 micron fineness), electrolyte and a mixture of acetylene black and graphite. Between anode and cathode was placed a layer of the selected electrolyte. In the following table are set forth examples of cell systems produced together with test data showing their operability. For comparison a test made utilizing the compound CNI as cathode is included. This system was totally inoperative not even showing an open circuit voltage.

TABLE I

| Cell system | Open circuit voltage | Polarization scans—Short term Operation established | |
|---|---|---|---|
| | | mA./in.$^2$ | At volts |
| Ag/KAg$_4$I$_4$CN/Zn(CN)$_2$+I$_2$ | 0.67 | 50 | 0.50 |
| Ag/KAg$_4$I$_4$CN/KZn(CN)$_3$+I$_2$ | 0.61 | 14 | 0.48 |
| Ag/KAg$_4$I$_4$CN/KCN+I$_2$ | 0.67+ | 73 | 0.55 |
| Ag/KAg$_4$I$_4$CN/CNI | 0 | 0 | 0 |
| Ag/4AgI+KI+Zn(Cn)$_2$/KZn(CN)$_3$+I$_2$ | 0.67 | 57 | 0.50 |
| Ag/4AgI+KI+Zn(Cn)$_2$/KCN+I$_2$ | 0.68+ | 84 | 0.63 |
| Ag/RbAg$_4$I$_5$/KZn(CN)$_3$+I$_2$ | 0.60 | 7 | 0.52 |
| Ag/KAg$_4$I$_4$CN/KAg$_4$I4CN+I$_2$ | 0.58 | 2.2 | 0.51 |

It will be observed from Table I that the cell Ag/4AgI – KI – Zn(CN)$_2$/KCNI$_2$ performed particularly well. In a further test of a cell of this system, the cell was continuously discharged at 72° F. across 4,000 ohms resistance, a current drain of about 0.17 milliamperes. Cell voltage of about 0.68 volt was maintained substantially constant for 100 hours. At 120 hours the voltage had fallen to about 0.65. Cell voltage dropped to about 0.4 volt between 120 and 130 hours.

Although for purposes of illustration cells utilizing silver as anode have been discussed, the material of the invention can be used with other anodes compatible with selected electrolytes. Also, although cell tests are shown at room temperature, the material of the invention can be used as cathode in systems operating at elevated temperature because of the stability of the iodine compound.

What is claimed is:

1. The reaction product of elemental iodine and a metal cyanide selected from the group consisting of cyanides of zinc, cadmium, potassium and mixtures thereof obtained by heating substantially equal molar proportions of elemental iodine and the selected cyanide in a sealed vessel to a temperature of about 220° C. in the absence of water.

2. The reaction product of elemental iodine and zinc cyanide produced under the conditions defined in claim 1.

3. The reaction product of elemental iodine and potassium cyanide produced under the conditions defined by claim 1.

4. The reaction product of elemental iodine and potassium zinc cyanide (KZN(CN)$_3$) produced under the conditions defined by claim 1.

5. The reaction product of elemental iodine and cadmium cyanide produced under the conditions defined by claim 1.

6. A cathode for a solid state nonaqueous battery which cathode is composed of a pelleted mixture in substantially equal proportions of the reaction product defined by claim 1, solid ionically conductive electrolyte, graphite and acetylene black.

* * * * *